Figures 1, 2:
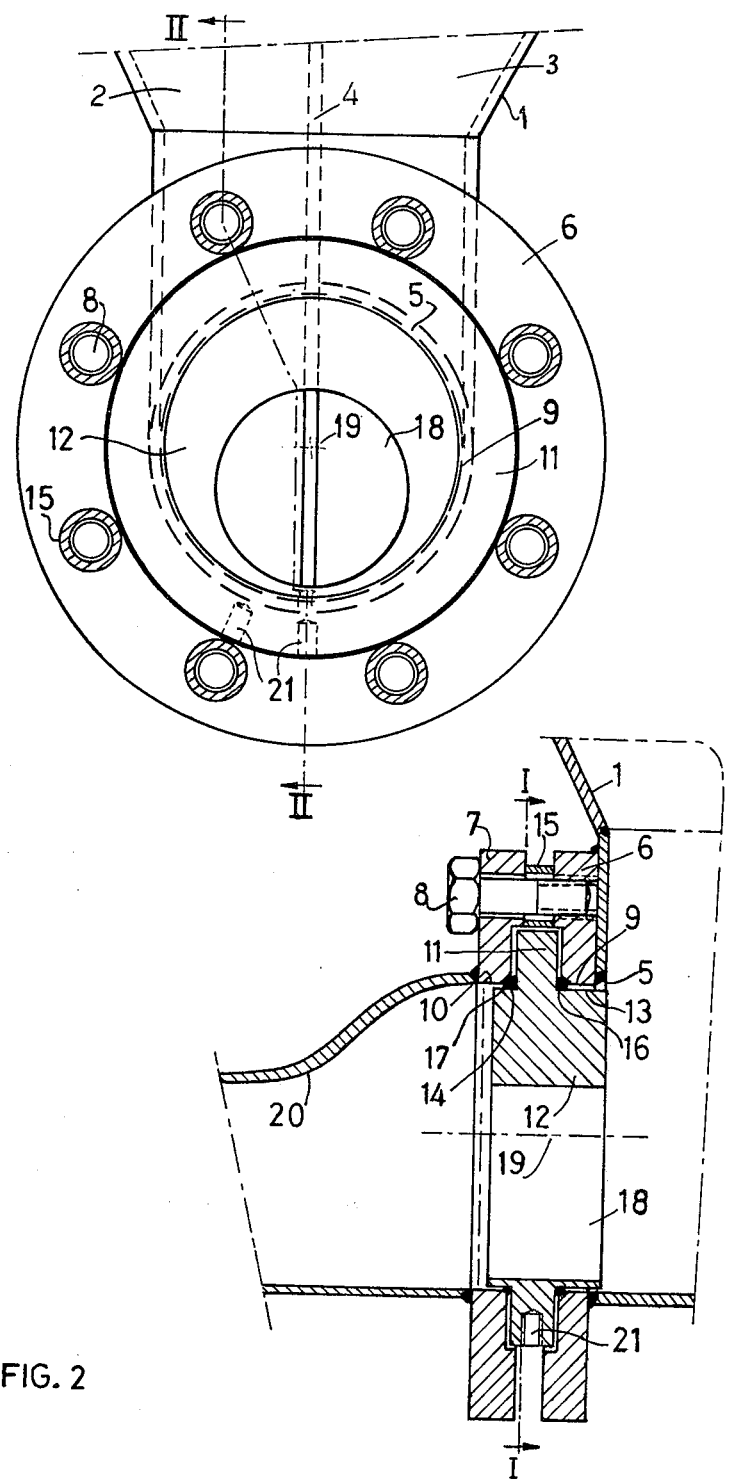

United States Patent [19]

Pielkenrood

[11] 3,938,713

[45] Feb. 17, 1976

[54] FLOW REGULATOR FOR SEDIMENT COLLECTING CHAMBERS OF A SEPARATING DEVICE

[75] Inventor: Jacob Pielkenrood, Krommenie, Netherlands

[73] Assignee: Pielkenrood-Vinitex B.V., Assendelft, Netherlands

[22] Filed: May 28, 1974

[21] Appl. No.: 472,946

[52] U.S. Cl. ............... 222/486; 210/534; 222/555
[51] Int. Cl.² ..................... B67D 3/00; B01D 21/10
[58] Field of Search ............ 210/83, 112, 519, 521, 210/522, 532 R, 533, 534; 222/144.5, 486, 555, 134; 137/266, 267, 625.41

[56] References Cited
UNITED STATES PATENTS

| | | | |
|---|---|---|---|
| 1,121,432 | 12/1914 | Westerman | 222/134 |
| 1,998,078 | 4/1935 | Freegard | 222/134 X |
| 2,057,834 | 10/1936 | Jurs | 137/267 X |
| 2,078,384 | 4/1937 | Jefferson | 137/267 |
| 2,310,620 | 2/1943 | Dye | 222/486 X |
| 2,907,461 | 10/1959 | Lee | 210/112 X |
| 3,153,494 | 10/1964 | Heider | 222/144.5 X |
| 3,497,109 | 2/1970 | Leach | 222/144.5 |
| 3,666,111 | 5/1972 | Pielkenrood et al. | 210/521 |
| 3,685,706 | 8/1972 | Fehling | 222/555 X |

*Primary Examiner*—Charles N. Hart
*Assistant Examiner*—Robert H. Spitzer
*Attorney, Agent, or Firm*—George F. Smyth

[57] ABSTRACT

A simple and efficient flow regulator for controlling the discharge from adjoining collecting chambers separated by a partition and including a common wall which includes a disc mounted in the side wall. The axis of rotation of the disc is in general aligned with the partition and the disc includes an opening asymmetrically disposed relative to the axis of rotation. Thus upon rotation of the disc the area of the opening communicating with each chamber is varied to vary the ratio of discharge flow from each chamber. Details of the structure and mounting are described.

10 Claims, 2 Drawing Figures

FLOW REGULATOR FOR SEDIMENT COLLECTING CHAMBERS OF A SEPARATING DEVICE

In the prior U.S. Pat. No. 3,666,111, a plate separator for separating precipitating components from a liquid has been described, in which superposed valleys of corrugated plates of the separator are interconnected by means of substantially vertical troughs opening at their lower ends in a first hopper-shaped sediment collecting chamber which is separated by means of a substantially vertical partition from a second hopper shaped sediment collecting chamber which is, at its upper side, in open connection with a supply chamber for the liquid to be treated, the latter chamber communicating, moreover, with the crests between the valleys of the passages between the corrugated plates, so that the sediment separated between the plates is collected in the first, and the sediment already separated in the supply chamber is collected in the second collecting chamber.

The aforesaid collecting chambers each terminate, at their lower ends, in a discharge nozzle through which the sediment can be removed. In practice these discharge nozzles are each provided with a valve, which valves can be actuated by means of pressurized air or oil, and are preferably connected to a timer so as to be opened at regular intervals in order to obtain a regular removal of the sediment. The amount of sediment separated between the plates is, in general, larger than the amount separated in the supply chamber. The ratio between both depends on the composition of the liquid to be treated and can fluctuate considerably. Both valves are, therefore, to be differently adjusted, and the adjustment is to be continually varied. A disadvantage of the use of two automatically controlled valves with variable timing adjustment is, however, that the cost of acquisition and maintenance are rather high.

The invention provides a simplification enabling the regulation of both discharge flows by means of only one automatically controlled valve. To that end use is made of a flow regulator comprising elements which, for a part, are constituted by wall portions of the sediment collecting chambers.

This regulator is characterised in that, near the lower ends of the collecting chambers, an opening in the side wall is provided which extends at both sides of the transverse partition, and in that a rotatable disc is mounted against this side wall, the axis of rotation thereof being situated in the vicinity of this partition, which disc is provided with an opening which is situated asymmetrically in respect of this axis of rotation, the opening in the side wall being larger than the opening in the disc at least to such an extent that, on rotating the disc by a substantial angle, the opening in the disc remains within the confines of the opening in the wall.

Thus it becomes possible to adjust the ratio between both discharge flow rates by means of a simple regulator requiring little space, which flows can be discharged then through a common duct provided with an automatically actuated valve.

The invention will be elucidated below by reference to a drawing showing in:

FIG. 1 a cross-section of a valve according to the invention with removed parts on the line I — I of FIG. 2; and FIG. 2 a cross-section of this valve on the line II — II of FIG. 1.

In the drawing a portion of a side wall 1 is shown which laterally defines two sediment collecting chambers 2 and 3, the first chamber being in open communication with a liquid supply chamber of a plate separator, and the other chamber 3 communicating with discharge troughs, the latter removing the sediment separated between the plates and collected in the valleys of these plates towards this collecting chamber 3 separately from the supply flow. The chambers 2 and 3 are mutually separated by a substantially vertical partition 4 extending from the trough and the intermediate guiding plates for the liquid flow down to the bottom of the chambers 2 and 3. For a description of the latter, reference is made to the prior U.S. Pat. application No. 3,666,111. Near the lower end of these chambers 2 and 3 a circular opening 5 is provided in the side wall 1, and a fixed flange 6 is welded against the outer side of the wall 1 which surrounds the opening 5.

A loose flange 7 is detachably connected to the fixed flange 6 by means of bolts 8 or the like. The flanges 6 and 7 each comprise a circular opening 9 and 10 resp. with the same diameter which substantially corresponds to the diameter of the opening 5. Between the flanges 6 and 7 a projecting collar 11 of a valve disc 12 is situated, which collar is narrower than the disc, and defines, together with the periphery of the latter, two straight shoulders 13 and 14. The outer diameter of the disc 12 at both sides of the collar 11 is a little smaller than the diameter of the openings 9 and 10 in the flanges 6 and 7 resp. In this manner this disc is maintained rotatably but not axially movable between the flanges 6 and 7. In order to prevent jamming of the disc 12, distance bushes 15 are preferably provided on the bolts 8 so as to keep the flanges 6 and 7 at the desired distance.

In the corners of the shoulders 13 and 14 sealing rings 16 and 17 are provided, the edges of the flanges 6 and 7 being chamfered there or being provided with another suitable recess so as to provide room for these sealing rings. In this manner a liquid-proof sealing is obtained between the disc 12 and the flanges 6 and 7, which rings, moreover, prevent the disc from rattling.

The disc 12 is provided with a through-hole 18, the axis of which is directed parallel to the centre axis 19 of the disc 12. The hole 18 has, in the example shown, a circular configuration. On the flange 7 a discharge nozzle 20 is welded which can be connected to a discharge duct not shown, in which preferably an automatically actuated valve is included.

As appears from FIG. 1, the opening 18 will, in the central position of the disc 12, be symmetrically situated in respect of the partition 4, so that the discharge of sediment collected in the chambers 2 and 3 will take place equally. On rotating the disc in one sense or the other, the part of the opening 18 communicating with one chamber will become larger than the part communicating with the other chamber so that the ratio between both discharge flow rates will be changed accordingly. In this manner the ratio between both flow rates can be varied at will.

The disc 12 can be actuated by means of, for instance, a handle not shown to be fixed in a hole 21 in the periphery of the disc between both flanges 6 and 7. If required several holes 21 can be provided if the stroke of this handle between two bolts 8 is too small for the desired adjustability.

The advantage of this regulator is that it has a very simple structure and uses parts already present, in particular the partition 4. Moreover this regulator requires very little space, and its manufacture can be very cheap. Such a regulator, moreover, obviates one automatically actuated valve so that the saving is considerable.

It will be clear that many other modifications of this valve are possible. For instance the sealing rings 16 and 17 can be arranged, instead of in the corners of the shoulders 13 and 14, in grooves provided in the periphery of the disc 12. Moreover the opening 18 can have another shape, for instance kidney-shaped, in which case the opening can be situated completely outside the axis of rotation 19 of the disc. This can, for the rest, also be the case with a circular opening if this opening will not be too small then. In the case of an opening situated wholly outside the rotation axis, a complete closing of one chamber 2 or 3 is always possible. The cross-sectional area of the opening 18 is preferably made not smaller than that of the adjoining discharge duct.

I claim:

1. In a flow regulator for the sediment discharge from two adjoining hopper-shaped sediment collecting chambers, wherein a substantially vertical partition separates the collecting chambers, and wherein the collecting chambers include a common side wall at the lower end thereof, the improvement comprising:

means forming an opening in said side wall and communicating with each chamber separated by the vertical partition, rotatable disc means mounted in said side wall adjacent to the partition, the partition extending at least the full diameter of said disc, means forming an opening in said disc, the axis of rotation of the disc being in general alignment with the partition, the opening in said disc being asymmetrically disposed relative to the axis of rotation, the opening in the side wall being larger than the opening in the disc such that upon rotation of the disc the opening in the disc remains within the opening of the side wall, said disc including means to effect rotation thereof in the opening of said side wall, and rotation of the disc being operative to vary the area of the opening communicating with each chamber whereby the ratio of discharge flow may be varied.

2. A regulator as set forth in claim 1 wherein the opening in the side wall is circular.

3. A regulator as set forth in claim 1 wherein the opening in the wall is symmetrical with respect to the partition.

4. A regulator as set forth in claim 1 wherein the opening in the disc is circular.

5. A regulator as set forth in claim 1 wherein the opening in the disc is outside the axis of rotation of the disc.

6. A regulator as set forth in claim 1 further including ring flange means for mounting said disc against said side wall, and said disc being generally circular and being rotatable with respect to said side wall.

7. A regulator as set forth in claim 6 wherein said ring flange means includes a fixed flange and a spaced movable flange, said disc including a peripheral portion received between said flanges, and means to secure said flanges together thereby to secure said disc.

8. A regulator as set forth in claim 7 wherein spacer bushings are provided between said flanges.

9. A regulator as set forth in claim 7 wherein seal means are provided between the disc and the end wall and between the disc and the movable flange.

10. A regulator as set forth in claim 9 wherein the opening of the end wall and the opening of the fixed flange are chamfered, said disc including shoulders cooperating with adjacent flanges, and sealing means provided between adjacent flanges and shoulders.

* * * * *